Figure 1:
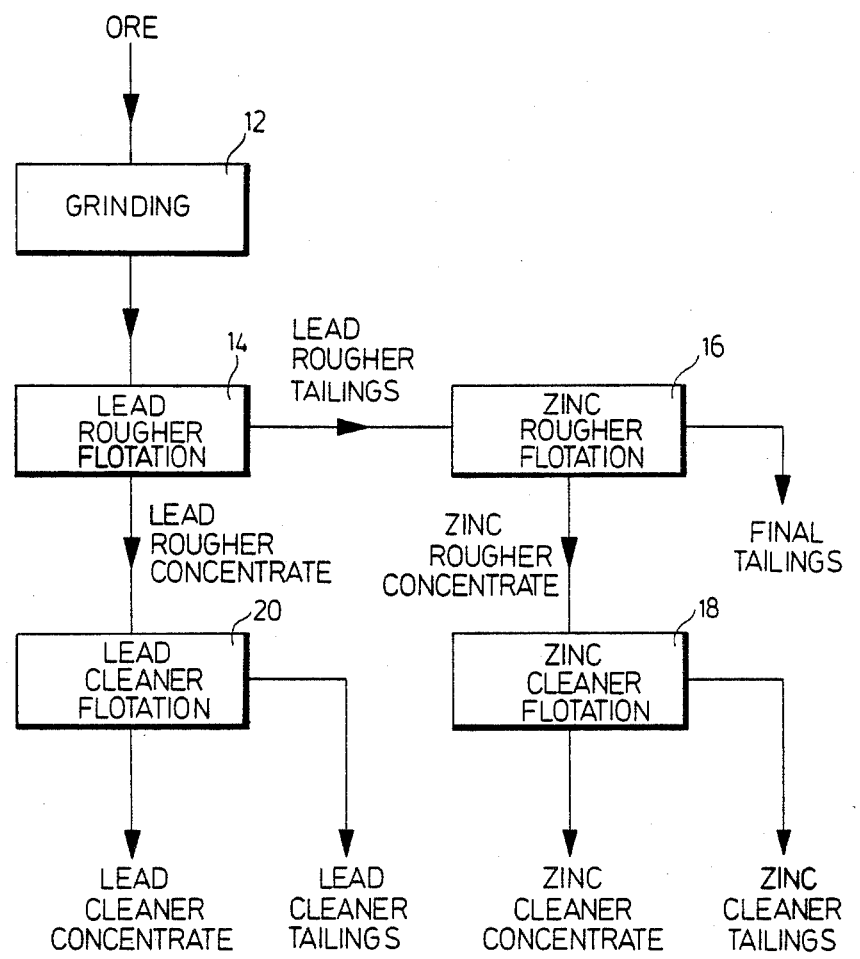

United States Patent [19]

Weir et al.

[11] Patent Number: 4,545,963
[45] Date of Patent: Oct. 8, 1985

[54] PROCESS FOR SEPARATELY RECOVERING ZINC AND LEAD VALUES FROM ZINC AND LEAD CONTAINING SULPHIDIC ORE

[75] Inventors: Donald R. Weir; Ian M. Masters, both of Fort Saskatchewan; Barry N. Doyle, Edmonton; Michael E. Chalkley, St. Albert, all of Canada

[73] Assignee: Sherritt Gordon Mines Limited, Toronto, Canada

[21] Appl. No.: 536,013

[22] Filed: Sep. 26, 1983

[30] Foreign Application Priority Data

Sep. 29, 1982 [GB] United Kingdom ............... 8227727

[51] Int. Cl.$^4$ .................. C01G 3/00; C01G 21/00; C01G 9/00
[52] U.S. Cl. .................... 423/26; 423/27; 423/36; 423/41; 423/92; 423/95; 423/98; 423/106; 423/109; 423/146; 423/150; 75/101 R; 75/108; 75/115; 75/117; 75/120; 204/119
[58] Field of Search ............... 423/95, 98, 109, 150, 423/41, 26, 140, 27, 36, 92, 106, 146, 101 R, 108, 115, 117; 75/120, 118 R; 204/119

[56] References Cited

U.S. PATENT DOCUMENTS

| | | |
|---|---|---|
| 3,867,268 | 2/1975 | Kawulka et al. .................. 423/109 |
| 4,063,933 | 12/1977 | Peters ................................ 75/118 R |
| 4,279,867 | 7/1981 | Weir .................................... 423/26 |
| 4,366,127 | 12/1982 | Rastas et al. ...................... 423/26 |
| 4,385,038 | 5/1983 | Rastas et al. ...................... 423/26 |
| 4,440,569 | 4/1984 | Weir et al. ........................ 423/109 |
| 4,443,253 | 4/1984 | Weir et al. ........................ 423/140 |

Primary Examiner—John Doll
Assistant Examiner—Robert L. Stoll
Attorney, Agent, or Firm—Robert F. Delbridge; Arne I. Fors

[57] ABSTRACT

A process for separately recovering zinc and lead values from zinc and lead containing sulphidic ore which also contains iron comprises subjecting ground ore to a first flotation step to float an initial lead concentrate containing zinc and produce zinc and iron containing tailings. The zinc and iron containing tailings are subjected to a second flotation step to float an initial zinc concentrate containing iron and also produce tailings. The initial zinc concentrate is subjected to a third flotation step to float a further zinc concentrate containing iron and also produce zinc and iron containing tailings. The zinc and iron containing tailings from the third flotation step and at least a lead and zinc containing portion of the initial lead concentrate are leached in a first leach step under oxidizing conditions at a temperature in the range of from about 130° to about 170° C. in aqueous sulphuric acid solution with a stoichiometric excess of sulphuric acid relative to the zinc content of from about 50 to about 150% so as to give a terminal acidity of from about 50 to about 80 g/L to produce a lead-containing residue and a first leach solution containing zinc and iron. The lead containing residue is separated from the first leach solution and the first leach solution is treated with the further zinc concentrate or calcine produced therefrom by roasting to dissolve zinc therefrom and precipitate a substantial amount of dissolved iron, thereby producing an iron containing residue and a second leach solution containing zinc. The iron containing residue is separated from the second leach solution, and the second leach solution is treated to recover zinc.

9 Claims, 4 Drawing Figures

PROCESS FOR SEPARATELY RECOVERING ZINC AND LEAD VALUES FROM ZINC AND LEAD CONTAINING SULPHIDIC ORE

This invention relates to the separate recovery of zinc and lead values from zinc and lead containing sulphidic ore which also contains iron and which may also contain silver and/or copper.

To maximize the recovery of zinc and lead from such ore in an economical manner, it has been the conventional practice to subject ground ore to a flotation operation with various steps to produce a lead concentrate, a zinc concentrate and tailings which also contain lead and zinc, with all these components also containing iron. Because of undesirable zinc and/or lead losses to the tailings when lead concentrate and zinc concentrate of required composition are produced, it has also been proposed to produce a bulk concentrate, i.e. a blend of various components from the flotation operation, which contains recoverable amounts of lead and zinc. However, even with such bulk concentrates, it is difficult to recover zinc and lead as economically as desired. Further difficulties of this kind arise when the ore also contains silver and/or copper which it is desired to recover.

According to the present invention, a process for separately recovering zinc and lead values from such ore comprises subjecting ground ore to a first flotation step to float an initial lead concentrate containing zinc and produce zinc and iron containing tailings, subjecting the zinc and iron containing tailings to a second flotation step to float an initial zinc concentrate containing iron and also produce tailings, subjecting the initial zinc concentrate to a third flotation step to float a further zinc concentrate containing iron and also produce zinc and iron containing tailings, leaching the zinc and iron containing tailings from the third flotation step and at least a lead and zinc containing portion of the initial lead concentrate in a first leach step under oxidizing conditions at a temperature in the range of from about 130° to about 170° in aqueous sulphuric acid solution with a stoichiometric excess of sulphuric acid relating to the zinc content of from about 50 to about 150% so as to give a terminal acidity of from about 50 to about 80 g/L to product a lead-containing residue and a first leach solution containing zinc and iron, separating the lead containing residue from the first leach solution, treating the first leach solution with the further zinc concentrate or calcine produced therefrom by roasting to dissolve zinc therefrom and precipitate a substantial amount of dissolved iron, thereby producing an iron containing residue and a second leach solution containing zinc, separating the iron containing residue from the second leach solution, and treating the second leach solution to recover zinc.

The first leach solution may be treated with the further zinc concentrate by leaching the further zinc concentrate in the first leach solution in a second leach step under oxidizing conditions at a temperature in the range of from about 130 to about 170° C.

The initial lead concentrate may be subjected to a fourth flotation step to float a further lead concentrate and lead and zinc containing tailings, and said lead and zinc containing tailings constitute said lead and zinc containing portions leached with the zinc and iron containing tailings in the first leach step. Alternatively, the initial lead concentrate may be leached with zinc and iron containing tailings in the first leach step.

The iron containing residue from the second leach step may also contain undissolved zinc containing sulphidic material, and in this case the process may also include separating the undissolved zinc containing sulphidic material from the remainder of the iron containing residue, and feeding the separated zinc containing material to the first leach step.

Where the ore also contains silver, a major portion of the silver is present in the lead containing residue from the first leach step and is consequently recoverable therefrom.

Where the ore also contains copper, the process may also include subjecting the initial lead concentrate to a fifth flotation step to float an initial copper concentrate and intermediate lead and zinc containing tailings, subjecting the intermediate lead and zinc tailings to a sixth flotation step to float a further lead concentrate and further lead and zinc tailings, subjecting the initial copper concentrate to a seventh flotation step to float a further copper concentrate and produce copper and zinc tailings, leaching the zinc and iron tailings, the lead and zinc tailings and the copper and zinc tailings in the first leach step, and leaching the further zinc concentrate in the second leach step.

The first leach solution may be treated with calcine to precipitate iron and dissolve zinc. In this case, the iron-containing residue contains iron as zinc ferrite, and may be treated with a strong sulphuric acid solution to dissolve zinc ferrite and produce a zinc and iron containing solution which can be recycled to the treatment of the first leach solution with calcine to precipitate iron.

Figure 2:
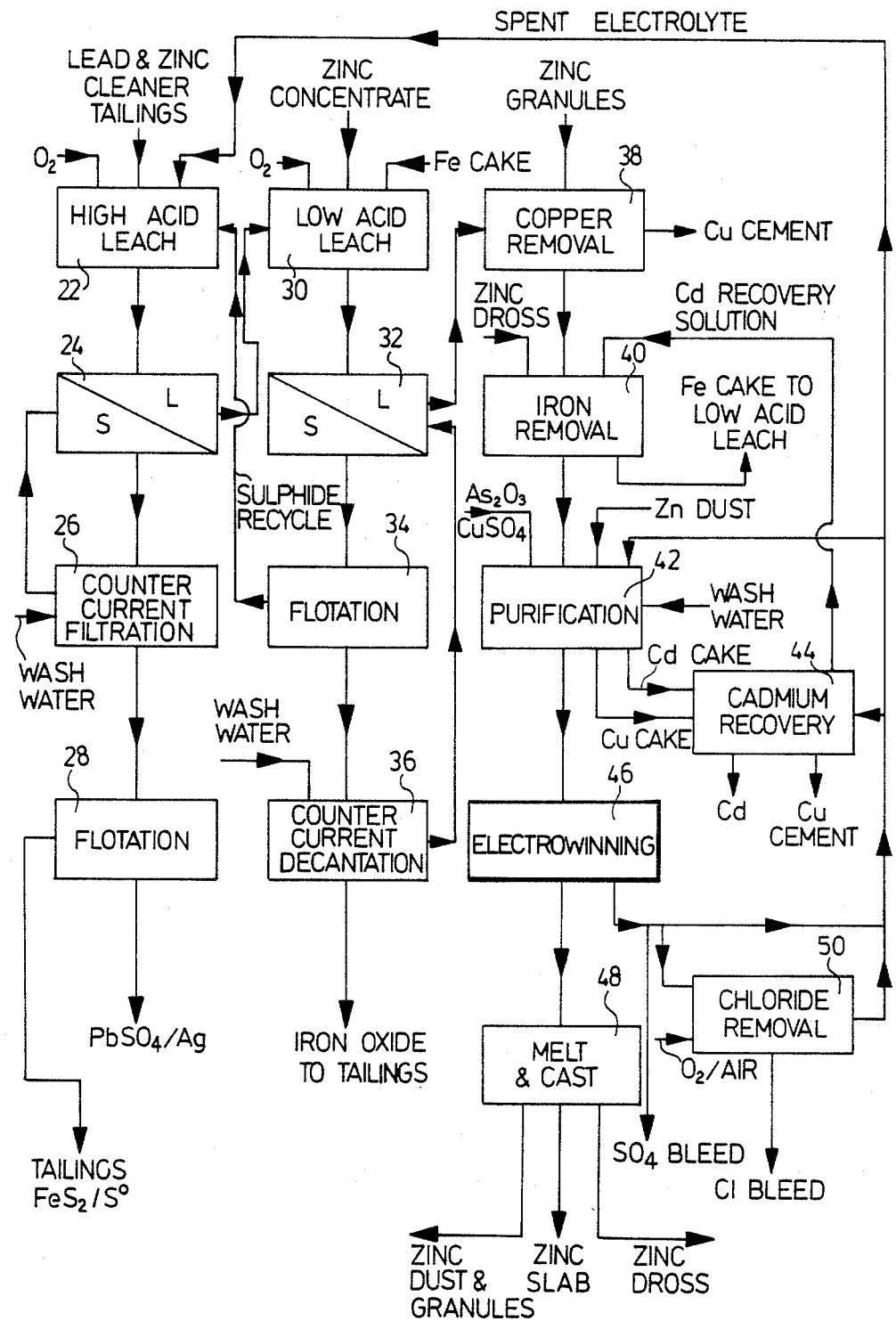
Figure 3:
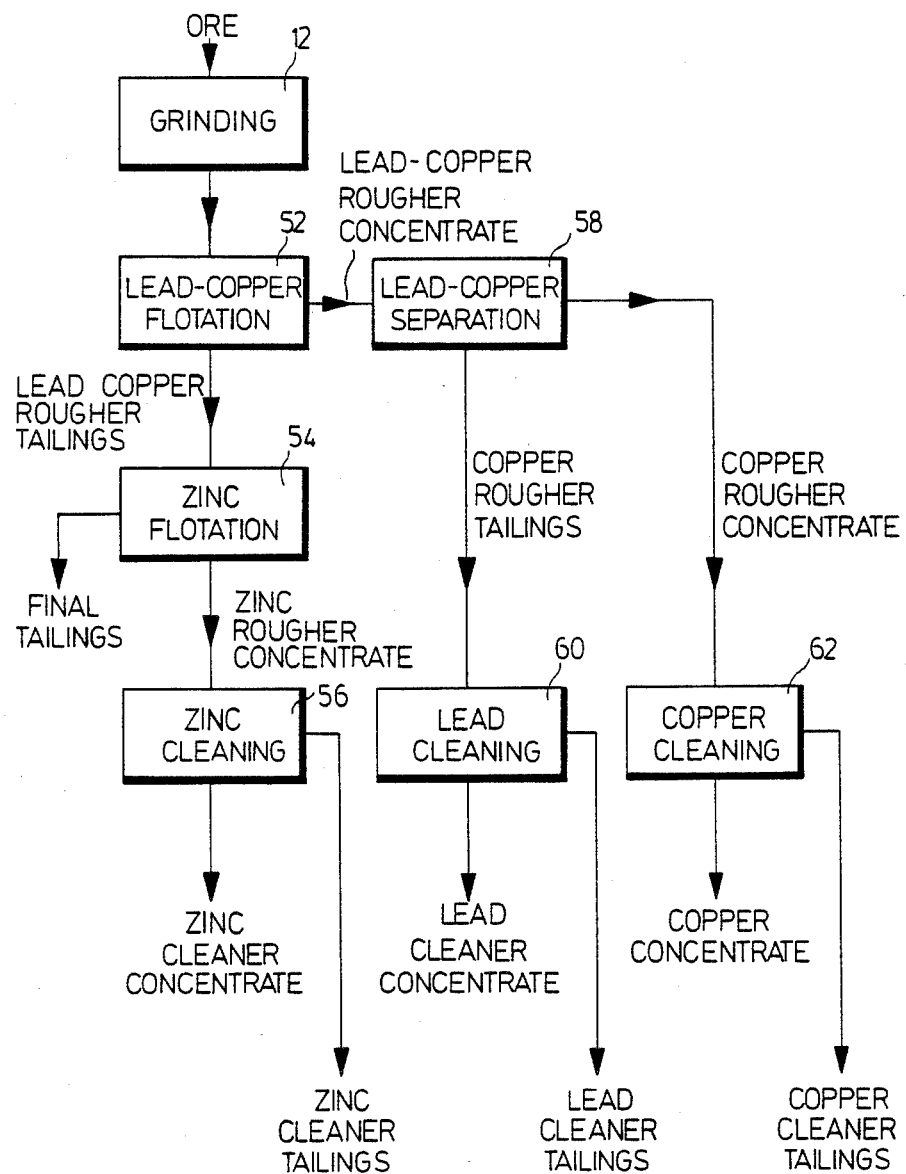
Figure 4:
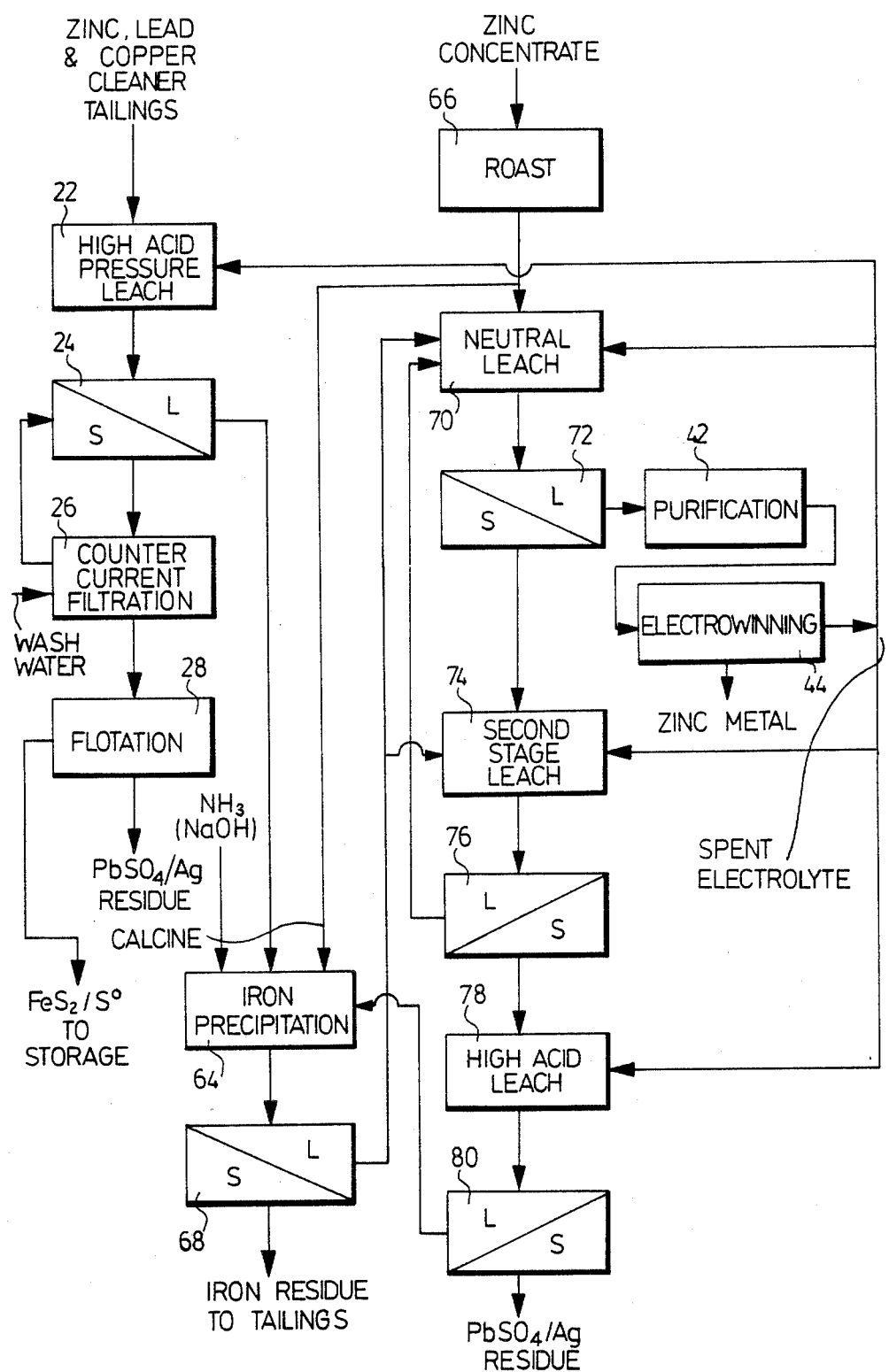

Embodiments of the invention will now be described by way of example, with reference to the accompanying drawings, of which:

FIG. 1 is a flow diagram of a flotation operation in accordance with one embodiment of the invention, FIG. 2 is a flow diagram of a hydrometallurgical process in accordance with an embodiment of the invention for treating the components produced in the flotation operation of FIG. 1, FIG. 3 is a flow diagram of a modified flotation operation in accordance with another embodiment, and FIG. 4 is a flow diagram of a hydrometallurgical process in accordance with an embodiment of the invention for treating the components produced in the flotation operation of FIG. 3.

Referring first to FIG. 1 of the accompanying drawings, zinc and lead containing sulphidic ore which also contains iron, copper and silver, may typically contain by weight from about 0.2 to about 10% zinc, from about 0.3 to about 5% lead, from about 15 to about 40% iron, from about 0.1 to about 3% copper, from about 20 to about 50% sulphur, and from about 30 to about 100 g/t silver. Such ore is ground in a grinding step 12 and the ground ore is subjected to a first flotation step 14 in the form of lead rougher flotation to float a lead rougher concentrate, i.e. an initial lead concentrate containing zinc, and produce lead fougher tailings containing zinc and iron. The lead rougher tailings are then subjected to a second flotation step 16 in the form of zinc rougher flotation to float a zinc rougher concentrate, i.e. an initial zinc concentrate containing iron, and also produce tailings which can be discarded.

The zinc rougher concentrate is subjected to a third flotation step 18 in the form of zinc cleaner flotation to float a zinc cleaner concentrate, i.e. a further zinc concentrate containing iron, and produce zinc cleaner tailings, i.e. zinc and iron containing tailings. The zinc cleaner concentrate may typically contain by weight from about 50 to about 55% zinc, from about 0.5 to about 2% lead, from about 5 to about 10% iron, from about 0.1 to about 1% copper, from about 30 to about 35% sulphur, and from about 20 to about 100 g/t silver. The zinc cleaner tailings may typically contain by weight from about 5 to about 10% zinc, from about 1 to about 2% lead, from about 35 to about 45% iron, from about 0.1 to about 0.5% copper, from about 40 to about 50% sulphur, and from about 20 to about 100 g/t silver.

The lead rougher concentrate is subjected to a fourth flotation step 20 in the form of lead cleaner flotation to float a lead cleaner concentrate, i.e. a further lead concentrate, and produce lead cleaner tailings, i.e. lead and zinc containing tailings. The lead cleaner concentrate may typically contain by weight from about 5 to about 12% zinc, from about 35 to about 50% lead, from about 10 to about 20% iron, from about 1 to about 5% copper, from about 25 to about 30% sulphur and from about 500 to about 1000 g/t silver. The lead cleaner concentrate may therefore be treated in a lead smelter to recover lead and silver in a conventional manner. The lead cleaner tailings may typically contain by weight from about 3 to about 8% zinc, from about 3 to about 8% lead, from about 30 to about 45% iron, from about 0.2 to about 1% copper, from about 40 to about 50% sulphur, and from about 50 to about 200 g/t silver.

Referring now to FIG. 2, the lead cleaner tailings and the zinc cleaner tailings are mixed and fed to a high acid pressure leach step 22. In this leach step, the mixture is further mixed with unreacted zinc concentrate from a low acid pressure leach step which will be described in more detail later and with aqueous sulphuric acid solution in the form of spent electrolyte from a zinc electrolysis step which will also be described later, such that there is a stoichiometric excess of sulphuric acid relative to the zinc content of from about 50 to about 150%, preferably from about 60 to about 100%, so as to give a terminal acidity of from about 50 to about 80 g/L. The leach step 22 is carried out under a partial oxygen pressure in the range of from about 200 to about 700 kPa at a temperature in the range of from about 130° to about 170° C., preferably in the range of from about 140 ° to about 155° C.

The leach step 22 is carried out for a period of time until over 97% of the zinc has dissolved and over 95% of the lead is converted to lead sulphate. Over 60% of the copper is dissolved in this step. The residue contains iron as pyrite and contains substantially all the lead and silver in the mixture leached in the leach step 22.

The leach slurry then passes to a liquid/solids separation step 24 from which the solution proceeds to the low acid leach step which will be described later. The residue contains elemental sulphur, pyrite ($FeS_2$) and lead-silver material and is washed in a countercurrent filtration step 26, with the wash liquid being passed to the separation step 24 to avoid waste of leach solution, and the residue then proceeds to a flotation step 28 where the elemental sulphur and pyrite are separated from the lead/silver containing residue. The elemental sulphur and pyrite can be dealt with as desired, and the lead/silver residue is amenable to treatment in a lead smelter in known manner to recover lead and silver values. The lead/silver residue will typically contain from about 30 to about 60% lead, from about 400 to about 1000 g/t silver and less than about 3% iron.

The leach solution from the separation step 24 will typically contain from about 80 to about 90 g/L zinc, from about 20 to about 30 g/l iron, and from about 50 to about 80 g/L $H_2SO_4$. Substantially no lead or silver is dissolved in this leach step. The leach solution proceeds to a low acid leach step 30 in which the zinc cleaner concentrate is leached, together with iron cake from an iron removal step which will be referred to later. The lower acid leach step 30 is carried out with a stoichiometric excess of zinc of about 10 to 20% relative to the sulphuric acid. The leach step is carried out under an oxygen partial pressure of from about 400 to about 1000 kPa preferably from about 500 to about 700 kPa at a temperature of from about 130° to about 170° C., preferably from about 140° to about 155° C.

Owing to the excess of zinc concentrate, most of the iron in the leach solution from the high acid leach step 22 is precipitated as an iron oxide, and most of the iron dissolved from the zinc concentrate is precipitated in a similar manner. The leach slurry is then passed to a liquid/solids separation step 32. The residue from the separation step 32 proceeds to a flotation step 34 where the unreacted sulphides are floated and recycled to the high acid leach step 22. The tailings from the flotation step 36, with the washed liquid being recycled to the separation step 32 to minimize loss of leach solution and the washed iron oxide tailings are discarded.

The leach solution from the separation step 32 will typically contain from about 140 to about 155 g/L zinc, from about 0.5 to about 1.5 g/L iron, and from about 1 to about 5 g/L sulphuric acid. This leach solution is passed to a copper removal step 38 where copper is cemented out on zinc granules, an iron removal step 40 where iron is removed by use of zinc dross (with the resultant iron cake being passed to the low acid leach step 30 as previously mentioned), a purification step 42 where copper sulphate and arsenic oxide ($As_2O_3$) are added to produce copper cake and cadmium cake, the cakes being passed to a cadmium recovery step 44 where spent electrolyte is added to produce cadmium and copper cement, with recovery solution being recycled to the iron removal step 40.

The purified leach solution then proceeds to an electrowinning step 46 where elemental zinc is produced, the zinc product being passed to a melting and casting step 48 to produce zinc dust granules, zinc slab and zinc dross. Part of the spent solution is bled off to remove sulphate ions, with most of the remainder of the spent solution being recycled to the high acid leach step 22, with part of the spent solution being passed through a chloride removal step 50 where chloride ions are oxidized to chlorine gas by oxygen or ozone, and a minor amount of spent solution being utilized in the cadmium recovery step 44 as previously mentioned.

If desired, the lead cleaner concentrate may also be leached in the high acid leach 22 instead of being treated in a lead smelter. In other words, the lead cleaner flotation step 20 of FIG. 1 can be omitted, with the lead rougher concentrate and the zinc cleaner tailings being leached in the high acid leach 22.

FIG. 3 shows an alternative flotation operation which is especially useful when the ore containing an appreciable amount of copper, for example from about 0.2 to about 2% copper by weight, and the ore mineralogy is amenable to the recovery of a separate copper concentrate. After the grinding step 12, the ore is subjected to a lead-copper flotation step 52 to float a lead-copper rougher concentrate and produce lead-copper rougher tailings. The tailings are passed to a zinc flotation step 54 to float a zinc rougher concentrate and produce pyrite tailings. The zinc rougher concentrate proceeds to a zinc cleaning flotation step 56 to produce a zinc cleaner concentrade and zinc cleaner tailings. The zinc cleaner concentrate is then leached in the low acid leach step 30 of FIG. 2.

The lead-copper rougher concentrate passes to a lead-copper separation flotation step 58 to float a copper rougher concentrate and produce copper rougher tailings. The copper rougher tailings proceed to a lead cleaning flotation step 60 to float a lead cleaner concentrate and produce lead cleaner tailings. The lead cleaner concentrate can be treated in a lead smelter. The copper rougher concentrate proceeds to a copper cleaning flotation step 62 to float a copper concentrate and produce copper cleaner tailings. The copper concentrate can be treated in a copper smelter.

The zinc cleaner tailings, the lead cleaner tailings and the copper cleaner tailings can be mixed and treated in the high acid leach step 22 of FIG. 2.

FIG. 4 shows another manner for treating the components produced in the flotation operation of FIG. 3, the difference between the flow diagram of FIG. 4 and the flow diagram of FIG. 2 being the manner in which the leach solution from the liquid/solids separation step 24 is treated.

In the flow diagram of FIG. 4, the leach solutions from the separation step 24 and from a high acid leach step to be described later proceed to an iron precipitation step 64 where the solution is treated with calcine produced by roasting zinc concentrate in a roast step 66. The roasting is carried out at a temperature of from about 900° to about 950° C. to convert the zinc sulphide content to oxide form, with some zinc ferrites consequently being produced.

In the iron precipitation step 64, the acid in the leach solution is partially neutralized and most of the iron in solution is precipitated, the step being carried out at a temperature of from about 80° to about 90° C. and at a pH of about 1.5. A jarosite producing cation such as ammonium or sodium is advantageously added in this step to promote effective iron removal as ammonium or sodium jarosite. The resultant slurry is passed to a liquid/solids separation step 68 from which the iron containing residue is discarded as tailings. The leach solution now contains from about 150 to about 170 g/L zinc, from about 0.5 to about 1 g/L iron and from about 3 to about 5 g/L sulphuric acid.

A portion of the separated leach solution proceeds to a neutral leach step 70 where calcine from the roast step 66 is leached under atmospheric pressure to cause further zinc dissolution and further iron precipitation. In the neutral leach step 70, the aqueous sulphuric acid leach solution formed by the portion of the leach solution from separation step 68, recycled leach solution from a second stage leach to be described, and spend electrolyts as will be described in more detail later. The calcine is leached at a temperature of from about 80° to about 90° C. to dissolve at least about 85% of the zinc oxide in the calcine, and produce a leach solution with a pH of from about 4.5 to about 5.5 and containing from about 140 to about 180 g/L zinc and less than about 0.01 g/L iron.

The slurry from the neutral step 70 is passed to a liquid/solids separation step 72 from which the resultant leach solution proceeds to purification step 42 and electrowinning step 44 as in FIG. 2. The spent electrolyte is recycled to the high acid pressure leach step 22, the neutral leach step 70 and to two further leach steps yet to be described. The spent electrolyte contains from about 40 to about 60 g/L zinc and from about 150 to about 180 g/L sulphuric acid.

The residue from the separation step 72 is leached in a second stage atmospheric leach step 74 with spent electrolyte and the other portion of leach solution from separation step 68 to effect further zinc dissolution. In second stage leach step 74, the residue is leached in weak sulphuric acid solution containing from about 10 to about 15 g/L sulphuric acid and from about 130 to about 140 g/L zinc, with the temperature being from about 80° to about 85° C. This step dissolves the remaining zinc oxide in the original calcine, with the remaining zinc being zinc ferrites. The leach slurry is passed to a liquid/solids separation step 76 from which the leach solution is recycled to the neutral leach 70.

The residue from the separation step 76 is leached in a high acid atmospheric leach step 78 with spent electrolyte to dissolve zinc ferrites formed in the roast step 66. In this step, the residue is leached in aqueous sulphuric acid solution containing from about 150 to about 180 g/L sulphuric acid at a temperature of aboit 95° C. to dissolve zinc and iron in the zinc ferrites, and produce a leach solution containing from about 90 to about 110 g/L zinc and from about 10 to about 20 g/L ferric iron, with a sulphuric acid concentration of from about 20 to about g/L.

The resultant slurry is passed to a liquid/solids separation step 80 from which the leach solution is recycled to the iron precipitation step 64. The residue from the separation step 80 contains the lead and silver values which were in the original zinc concentrate treated in the roast step 66, and can be treated in the same manner as the residue from the flotation step 28.

Examples of the invention will now be described.

EXAMPLES

1. Continuous Pressure Leaching of Zinc Cleaner Tailings

Continuous pressure leaching tests were conducted on a low grade zinc concentrate, from a zinc upgrading flotation circuit, which analyzed 0.63% Cu, 25.1% Fe, 2.52% Pb, 131 g/t Ag, 42.9% S and 27.0% Zn. The electrolyte feed to the pressure leach analyzed 180 g/L $H_2SO_4$ and 55 g/L Zn. The zinc concentrate, as a 70% solids slurry, and the electrolyte were separately fed to the first compartment of a six compartment autoclave with a total volume of aporoximately 36 L. Each compartment was equipped with an agitator, baffles, oxygen sparge tube, thermocouple well and sampling line. Leach slurry proceeded from one compartment to the next by means of overflow weirs. The product slurry from the final compartment was discharged at a rate to match the incoming feed material.

Samples were withdrawn from the autoclave compartments at various intervals and analyzed to determine the solution and residue compositions.

The leach temperature was maintained at 150° C. The total pressure in the autoclave was 100 psig (790 kPa), corresponding to approximately 50 psi (345 kPa) oxygen partial pressure. Oxygen was sparged into the various compartments at approximately 50% in excess of the stoichiometric requirements for the oxidation of zinc sulphide.

The flow rates of zinc concentrate slurry and electrolyte were set so that the final acid concentration in the discharge solution would be 60 to 65 g/L. The retention time was 60 minutes. Leach additives, 0.5 kg/t Lignosol and 1.0 kg/t Quebracho, were added to the autoclave to ensure satisfactory zinc extraction rates.

Copper, iron and zinc extractions in the leach are given in Table I.

TABLE I

| Compartment | Extraction (%) | | |
|---|---|---|---|
| | Cu | Fe | Zn |
| 1 | 21.5 | 8.1 | 65.8 |
| 2 | 25.9 | 8.9 | 77.2 |
| 3 | 35.9 | 13.3 | 89.5 |
| 4 | 41.1 | 14.5 | 93.9 |
| 5 | 47.3 | 15.6 | 95.9 |
| 6 | 51.0 | 16.2 | 97.2 |

Final solution and residue analyses are given in Table II

TABLE II

| Component | Solution (g/L) | Residue (%, g/t Ag) |
|---|---|---|
| Cu | 0.87 | 0.48 |
| Fe | 10.8 | 31.1 |
| $Fe^{2+}$ | 3.7 | — |
| Pb | — | 3.31 |
| Ag | — | 176 |
| S° | — | 19.6 |
| S(SO$_4$) | n.a. | 0.62 |
| $H_2SO_4$ | 65 | — |
| Zn | 120 | 0.98 | n.a. = not analyzed.

EXAMPLE 2

BATCH PRESSURE LEACHING OF LEAD CIRCUIT TAILINGS

Batch pressure leaching tests were conducted on lead circuit tailings, which analyzed 0.49% Cu, 33.0% Fe, 6.36% Pb, 183 g/t Ag, 36.2% S and 6.87% Zn. The electrolyte feed to the pressure leach analyzed 150 g/L $H_2SO_4$ and 50 g/L Zn. Lead tailings and electrolyte were fed to a batch autoclave to give a total slurry volume of approximately 2.5 L. The autoclave was equipped with an agitator, oxygen sparge tube, thermocouple well, sampling line and baffles. Upon completion of the leach, the slurry was cooled in the autoclave prior to discharge.

The leach temperature was 150° C. The total pressure in the autoclave was 105 psig (820 kPa), corresponding to approximately 50 psi (345 kPa) oxygen partial pressure. Oxygen was sparged into the autoclave and the pressure was controlled by maintaining a flow of vent gas of 0.5 L/min. The ratio of concentrate:electrolyte was chosen so that the final acid concentration in the discharge solution would be 60 to 65 g/L. The retention time was 60 minutes. Leach additives, 0.23 kg/t Lignosol and 0.46 kg/t Quebracho, were added to the charge to ensure satisfactory metal extractions.

Copper, iron and zinc extractions are given in Table I.

TABLE I

| Extraction, % | | |
|---|---|---|
| Cu | Fe | Zn |
| 73.0 | 32.1 | 99.3 |

Final solution and residue analyses are given in Table II

TABLE II

| Component | Solution (g/L) | Residue (%, g/t Ag) |
|---|---|---|
| Cu | 1.48 | 0.19 |
| Fe | 42.7 | 31.9 |
| Pb | — | 8.46 |
| Ag | — | 206 |
| S° | — | 5.53 |
| $H_2SO_4$ | 62.7 | — |
| Zn | 81.2 | 0.06 |

The coarse sulphidic fraction of the leach residue was recovered by screening and the screen undersize was subjected to a rougher flotation to separate the sulphidic and oxidic fractions. The residue analyses of the three products are presented in Table III.

TABLE III

| Component | +150 μm Fraction (%) | Rougher Conc (%) | Rougher Tailings (%) |
|---|---|---|---|
| Ag (g/t) | 130 | 128 | 433 |
| Cu | 0.24 | 0.24 | 0.24 |
| Fe | 41.0 | 42.0 | 3.52 |
| Pb | 0.96 | 0.83 | 31.0 |
| S° | 7.0 | 8.0 | — |
| S | 54.3 | 56.4 | 7.66 |
| Zn | 0.07 | 0.07 | 0.03 |

The rougher tailings also contained the silica present in the lead tailings.

EXAMPLE 3

BATCH PRESSURE LEACH OF ZINC CONCENTRATE IN HIGH ACID LEACH DISCHARGE SOLUTION

The final solution from a high acid pressure leach was treated in a batch pressure leach with high grade zinc concentrate to produce a solution suitable for iron removal, purification and electrowinning. The zinc concentrate analyzed 0.5% Cu, 8.67% Fe, 0.83% Pb, 138 g/t Ag, 35.3% S and 52.9% Zn. The high acid leach solution analyzed 55 g/L $H_2SO_4$, 20 g/L Fe, 2 g/L Cu and 90 g/L Zn. Zinc concentrate and solution were fed to a batch autoclave to give a total slurry volume of 2.5 L. The autoclave was identical to that used for Example 2.

The leach temperature was 150° C. The total pressure in the autoclave was 75 psig (520 kPa), corresponding to approximately 20 psi (690 kPa) oxygen partial pressure. Operating conditions were as for Example 2. The ratio of concentrate: solution was chosen to give approximately 90% zinc extraction and ensure complete utilization of the acid and iron in the high acid leach discharge solution. The retention time was 60 minutes. Leach additives, 0.67 kg/t Lignosol and 1.34 kg/t Quebracho, were added to ensure satisfactory zinc extraction rates.

Extractions of copper and zinc are given in Table I.

TABLE I

| Extraction, % | |
|---|---|
| Cu | Zn |
| 65.9 | 89.5 |

Final solution and residue analyses are given in Table II

TABLE II

| Component | Solution (g/L) | Residue (%, g/t Ag) |
| --- | --- | --- |
| Cu | 2.45 | 0.24 |
| Fe | 0.90 | 29.9 |
| Pb | — | 1.30 |
| Ag | — | 185 |
| S° | — | 22.3 |
| $H_2SO_4$ | 6.62 | — |
| Zn | 146 | 7.73 |

Unleached zinc sulphide was recovered by flotation and would be recycled to the high acid leach stage. Residue analyses of rougher flotation products are presented in Table III.

TABLE III

| Component | Rougher Conc. (%) | Rougher Tailings (%) |
| --- | --- | --- |
| Ag (g/t) | 76 | 312 |
| Cu | 0.21 | 0.27 |
| Fe | 16.9 | 45.1 |
| Pb | 0.40 | 2.35 |
| S° | 41.3 | — |
| S | 66.1 | 16.9 |
| Zn | 11.0 | 3.9 |

Other embodiments and examples of the invention will be apparent to a person skilled in the art from the foregoing description, the scope of the invention being defined in the appended claims.

What we claim as new and desire to protect by Letters Patent of the United States is:

1. A process for separately recovering zinc and lead values from zinc and lead containing sulphidic ore which also contains iron, the process comprising subjecting ground ore to a first flotation step to float an initial lead concentrate containing zinc and produce zinc and iron containing tailings, subjecting the zinc and iron containing tailings to a second flotation step to float an initial zinc concentrate containing iron and also produce tailings, subjecting the initial zinc concentrate to a third flotation step to float a further zinc concentrate containing iron and also produce zinc and iron containing tailings, leaching the zinc and iron containing tailings from the third flotation step and at least a lead and zinc containing portion of the initial lead concentrate in a first leach step under oxidizing conditions at a temperature in the range of from about 130° to about 170° C. in aqueous sulphuric acid solution with a stoichiometric excess of sulphuric acid relative to the zinc content of from about 50 to about 150% so as to give a terminal acidity of from about 50 to about 80 g/L to produce a lead-containing residue and a first leach solution containing zinc and iron, separating the lead containing residue from the first leach solution, treating the first leach solution with the further zinc concentrate or calcine produced therefrom by roasting to dissolve zinc therefrom and precipitate a substantial amount of dissolved iron, thereby producing an iron containing residue and a second leach solution containing zinc, separating the iron containing residue from the second leach solution, and treating the second leach solution to recover zinc.

2. A process according to claim 1 wherein the first leach solution is treated with the further zinc concentrate by leaching the further zinc concentrate in the first leach solution in a second leach step under oxidizing conditions at a temperature in the range of from about 130° to about 170° C.

3. A process according to claim 1 wherein the initial lead concentrate is subjected to a fourth flotation step to float a further lead concentrate and lead and zinc containing tailings, and said lead and zinc containing tailings constitute said lead and zinc containing portion leached with the zinc and iron containing tailings in the first leach step.

4. A process according to claim 1 wherein the initial lead concentrate is leached with the zinc and iron containing tailings in the first leach step.

5. A process according to claim 1 wherein the iron containing residue from the second leach step also contains undissolved zinc containing sulphidic material, and the process includes separating the undissolved zinc containing sulphidic material from the remainder of the iron containing residue, and feeding the separated zinc containing material to the first leach step.

6. A process according to claim 1 wherein the ore also contains silver, and a major portion of the silver is present in the lead containing residue from the first leach step.

7. A process according to claim 1 wherein the ore also contains copper, and the process includes subjecting the initial lead concentrate to a fifth flotation step to float an initial copper concentrate and intermediate lead and zinc containing tailings, subjecting the intermediate lead and zinc tailings to a sixth flotation step to float a further lead concentrate and further lead and zinc tailings, subjecting the initial copper concentrate to a seventh flotation step to float a further copper concentrate and produce copper and zinc tailings, leaching the zinc and iron tailings, the lead and zinc tailings and the copper and zinc tailings in the first leach step, and leaching the further zinc concentrate in the second leach step.

8. A process according to claim 1 wherein the first leach solution is treated with calcine to precipitate iron and dissolve zinc.

9. A process according to claim 8 wherein the iron-containing residue contains iron as zinc ferrite, and said residue is treated with a strong sulphuric acid solution to dissolve zinc ferrite and produce a zinc and iron containing solution, with said zinc and iron containing solution being recycled to said treatment of said first leach solution with calcine to precipitate dissolved iron.

* * * * *